April 2, 1940.　　　G. L. WILLIAMS　　　2,195,550
RADIAL ENGINE CONNECTING ROD SYSTEM
Filed Aug. 14, 1937　　　2 Sheets-Sheet 1
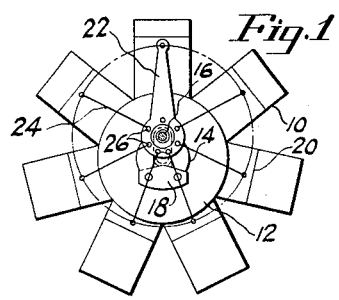
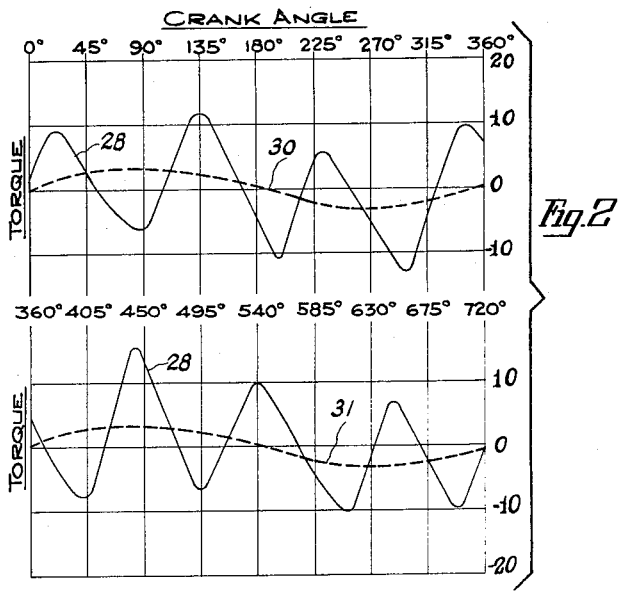
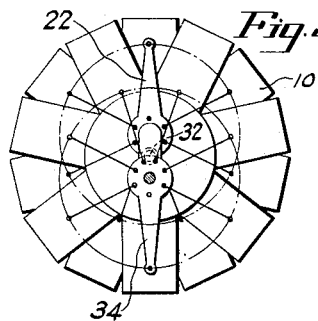
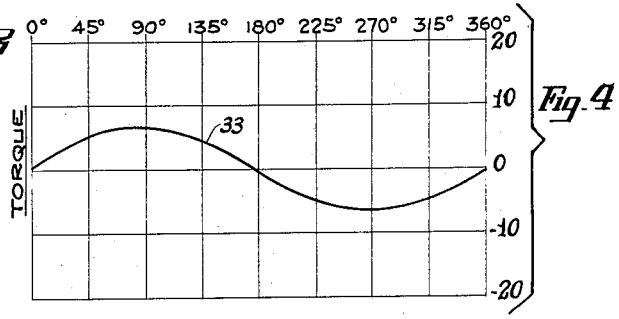
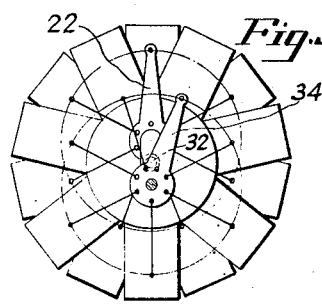
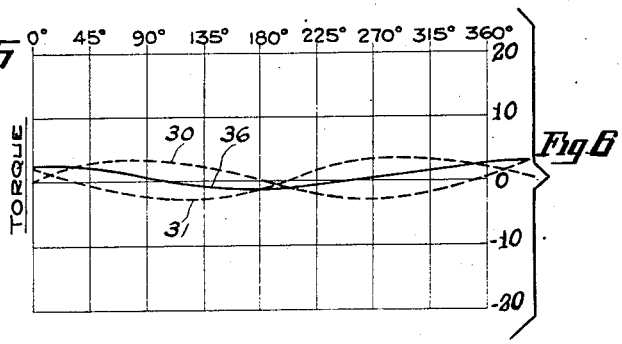
INVENTOR.
George L. Williams
BY Harris G. Luther
ATTORNEY April 2, 1940.  G. L. WILLIAMS  2,195,550
RADIAL ENGINE CONNECTING ROD SYSTEM
Filed Aug. 14, 1937   2 Sheets-Sheet 2
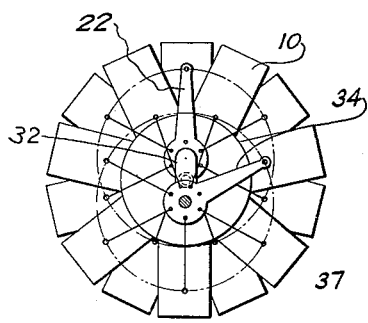
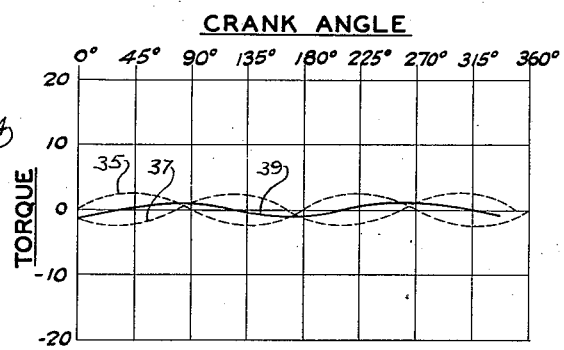
INVENTOR
George L. Williams
BY Harris G. Luther
ATTORNEY Patented Apr. 2, 1940

2,195,550

UNITED STATES PATENT OFFICE 2,195,550

RADIAL ENGINE CONNECTING ROD SYSTEM

George L. Williams, Manchester, Conn., assignor to United Aircraft Corporation, East Hartford, Conn., a corporation of Delaware Application August 14, 1937, Serial No. 159,200

5 Claims. (Cl. 123—55)

This invention relates to improvements in engines and has for an object the elimination or reduction of vibration in certain types of engines.

A further object of the invention resides in the provision of an improved method of eliminating or reducing engine vibrations caused by the geometry of the master and link-rod system of a radial engine without adding additional elements to the engine for that purpose.

A still further object resides in an arrangement of conventional engine parts in such a manner that vibration generating forces acting on these parts will tend to oppose and counteract each other thereby reducing the vibration by diminishing the vibration exciting forces.

Other objects and advantages will be more particularly pointed out hereinafter or will become apparent as the description proceeds.

In the accompanying drawings in which like reference numerals are used to designate similar parts throughout there are schematically shown one illustrative manner of applying the improved method to a certain type of engine and an engine arranged according to the improved method for reducing vibration. The drawings, however, are for the purpose of illustration only and are not to be taken as limiting the invention, the scope of which is to be measured entirely by the scope of the appended claims.

In the drawings, Fig. 1 is a schematic illustration of an engine or portion of an engine including a single bank of radially disposed cylinders and a single master connecting rod.

Fig. 2 is a chart indicating certain operating characteristics of an engine or engine portion as illustrated in Fig. 1.

Fig. 3 is a schematic illustration of a conventional two-bank radial engine having a pair of oppositely arranged master connecting rods disposed one in each bank.

Fig. 4 is a chart showing certain operating conditions of the engine arrangement illustrated in Fig. 3.

Fig. 5 is a schematic view of an engine similar to that illustrated in Fig. 3 in which the master rods are disposed respectively in adjacent cylinders of the two radial banks.

Fig. 6 is a chart showing certain operating characteristics of the engine arrangement illustrated in Fig. 5.

Fig. 7 is a schematic illustration of an engine similar to the engine construction illustrated in Figs. 3 and 5 but with the master rods disposed in respective cylinders in the two radial banks separated by an angle of as near ninety degrees as the cylinder arrangement will permit, and Fig. 8 is a chart showing certain operating characteristics of the engine illustrated in Fig. 7.

Referring to the drawings in detail, the engine illustrated in Fig. 1 may be considered as one row of cylinders of a multi-row radial engine or may be considered as a complete single-row radial engine of conventional form. Such an engine has a plurality of cylinders 10, in this instance seven cylinders, arranged around a crankcase 12 so that the cylinders are equally spaced and project radially from the crankcase. Concentric with the crankcase there is a rotatable single-throw crankshaft 14, which is provided with a crankpin 16 and a counterweight 18. There is a piston 20 reciprocable in each cylinder 10 and these pistons are operatively connected with the crankshaft by means of a connecting-rod system including a master rod 22 and link rods 24. In the form of engine illustrated, the master rod 22 is connected to the piston in the top cylinder, usually designated as number 1 cylinder, and has a big end surrounding the crank pin 16. The link rods 24 are each pivotally connected at one end to a respective piston and at the other end to the big end of the master rod 22, usually by means of suitable pin connections 26.

The curve 28 in the chart of Fig. 2 shows certain effects of vibration generating forces incident to the operation of the engine. In the present instance the turning effort on the crankshaft 14 is plotted against the crank angle for two consecutive revolutions of the engine crank shaft. It will be noted that the peaks of this torque curve are not all of the same height. This is because the geometry of the connecting-rod system causes the various pistons to have different motions. These different motions cause a variation in the inertia and gas forces which variation is reflected in the crankshaft torque.

The portion of the curve 28 shown in the upper part of the chart, by way of example, illustrates the variation in crankshaft torque with respect to crank angle during a revolution of the crankshaft in which the alternate cylinders are fired beginning with the top cylinder. The portion of the curve 28 in the lower part of the chart shows the crankshaft torque variation with respect to crank angles during the succeeding revolution of the engine in which the remaining cylinders are fired successively. The two curves, if placed end to end, represent one complete operating cycle of a single-row four-cycle engine. The torque variation in an engine crankshaft is of a periodic nature and can, therefore, be divided or resolved into harmonic components of various frequencies and amplitudes, the total torque of the crankshaft being the sum of these harmonic components. The operating speed range of an engine is generally such that only one of the harmonic torque components can synchronize with the natural frequency of the crankshaft and cause objectionable vibration.

For the purpose of illustration an engine will be assumed whose characteristics are such that the objectionable harmonic component is the one indicated by the broken-line curves 30 and 31 in Fig. 2; this component completes one cycle in each revolution of the crankshaft. It is to be understood, however, that this particular harmonic has been singled out only for purposes of illustration and that the invention is equally applicable to any other harmonic of torque variation which may synchronize at any operative engine speed with the natural frequency of any portion of the engine or engine-driven mechanism, such as a propeller, and thereby set up objectionable vibration. For example, the second harmonic, which completes two cycles in each revolution of the crankshaft, may be the objectionable one.

The engine schematically illustrated in Fig. 3 is a conventional two-row radial engine having two juxtaposed seven-cylinder rows to form a 14-cylinder engine. One row is displaced with respect to the other so that contiguous cylinders in the two rows are 25 5/7 degrees apart. In the conventional arrangement the crankshaft 32 is of the double-throw type with the crankpins 180 degrees apart; the master rods 22 and 34 are arranged in opposed relationship so that if the master rod 22 of the front row, for instance, is in the top cylinder of that row, then the master rod 34 of the rear row is in the bottom cylinder of that row. Since it is not desirable to fire two opposed cylinders at the same time, the order of firing of the two rows is made alternate. The result of this master-rod and crankshaft arrangement and firing order is to add the turning efforts of two single-row engines, such as illustrated in Fig. 1, in a relationship one crankshaft revolution out of phase with each other. The turning effort of the engine will be more uniform, and indeed this is the usual object of increasing the number of cylinders of an engine. However, inspection of the chart of Fig. 2 shows that the first, or crankshaft speed, harmonic components of the torques of the two separate cylinder rows are in phase with each other and therefore add. The magnitude of the resultant harmonic for the complete engine is shown at 33 in the chart of Fig. 4. If at some operating speed of the engine, this large amplitude harmonic comes into resonance with the natural frequency of some part of the engine, such for instance, as the crankshaft, it is apparent that a severe vibration will be set up.

Continuing with the particular harmonic used for illustrative purposes in Figs. 2 and 4, Fig. 5 illustrates a manner of applying the invention to reduce this harmonic. The phase relation between the torques of the separate cylinder rows depends on the relative location of the two master-rod cylinders and of the crankpin. If, therefore, the master-rod cylinders of the two rows were placed side by side and the crankshaft is of the construction shown in Fig. 3, the phase difference between the torques of the two rows would be 180 degrees, that is, the same as the angle between the two crank throws. The first harmonics represented by the curves 30 and 31 of the chart of Fig. 2, when placed 180 degrees out of phase and then algebraically added would exactly cancel each other, the sum being zero at all points, so that this harmonic would be completely eliminated. In the actual engine it may not be convenient to have any cylinders of the two rows exactly in line with each other. Fig. 5 illustrates a conventional cylinder arrangement in which the master rods have been placed as nearly as possible in line. The chart of Fig. 6 shows the torque curves 30 and 31, drawn in their proper phase relationship; it will be seen that the resultant torque curve 36, each ordinate of which is the algebraic sum of the corresponding ordinates of the other two curves is smaller in amplitude than either of its components. The much smaller amplitude of curve 36, as compared with that of curve 33 in Fig. 4, shows a reduction in exciting force to such an extent that objectionable vibration is eliminated.

As stated above, it is sometimes desired to minimize a vibration of a frequency higher than the first order. By way of example, Figs. 7 and 8 show an arrangement for minimizing the second order torsional vibrations of the engine crankshaft. In this arrangement the master rods are disposed in cylinders which are separated by an angle as close to ninety degrees as the geometry of the engine will permit. In the fourteen cylinder engine illustrated this would have to be either 77½ degrees or 102½ degrees. An inspection of Fig. 8 indicates that if the master rods could be disposed at an angle of exactly ninety degrees the second order torsional vibrations could be entirely cancelled. The fact, however, that the master rods have to be arranged at an angle with respect to each other which is 12½ degrees more or less than the optimum ninety degrees leaves a small residual torsional vibration. The secondary vibration frequencies of the two banks of the engine are indicated by the dotted lines 35 and 37 in Fig. 8 and the residual vibration is indicated by the full line 39. It is entirely obvious, however, that the amplitude of the vibration indicated by the line 39 is much less than the amplitude of the vibration indicated by the lines 35 and 37.

While the application of the method for the selection, order determination, and correction of a particular torque variation harmonic has been particularly illustrated and described by way of example, it is to be understood that the method may with equal facility be applied to the correction of other torque harmonics in an engine of the type illustrated and may also be applied to the correction of any objectionable torque variation harmonic in any engine having a plurality of connecting-rod systems each including a master rod and a group of link rods.

The invention may be applied to any system where torque harmonics are set up by two or more moving bodies where phase relation may be altered to so algebraically add the harmonics as to reduce any desired one.

In a radial engine this phase relation may be altered by moving the master rod from one cylinder to another, as illustrated and described, or the phase relation may be altered by changing the angular relation of the crank throws, or indeed, the relation of the several crank throws and the relation of the several master rods may both be changed to obtain the desired result.

For example, in order to reduce the effect of the torque variation shown by the curves 30 and 31 of Figs. 1 and 3, the master rods may remain as shown in Fig. 2 and one of the crank-pins moved through 180 degrees to bring it into axial alignment with the other crankpin. The torque variations represented by the two curves 30 and 31 would then be 180 degrees out of phase and would completely off-set each other.

While there has been illustrated and described an example of the application of the improved method to a particular engine and the resulting improved engine construction, it is to be understood that the invention is not limited to the particular application nor to the application to any particular engine, but that the method may be applied in various ways to various engines to reduce or eliminate objectionable vibrations and is limited only by the scope of the appended claims.

Having now described the invention so that others skilled in the art may clearly understand the same what it is desired to secure by Letters Patents is as follows:

1. In a multi-row radical engine in which operation produces torque variations, certain harmonics of which are substantially in resonance with the frequency of a portion of said engine at predetermined operating speed of said engine, a master rod and link rods connected with a crankthrow and arranged in one row of cylinders, a second crankthrow displaced one hundred and eighty degrees from said first mentioned crankthrow, another master rod and link rods connected with said second crankthrow and arranged in another row of cylinders said second mentioned master rod being angularly displaced from the said first mentioned master rod an angular distance substantially equal to the angular distance traversed by the crankshaft during one cycle of said resonant harmonic vibration divided by the number of rows of cylinders.

2. In a multi-row four cycle engine having an odd number of cylinders in each row and having said cylinders so arranged that a cylinder of one row is disposed half way between two adjacent cylinders of the other row, a master rod and link rod system for each row connected with a respective crankthrow and creating objectionable periodic vibration-exciting forces in timed relation with the rotation of the crankthrow, another master rod and link rods connected with another crankthrow displaced one hundrerd and eighty degrees from said first mentioned crankthrow and creating vibration-exciting forces of the same frequency as the first-mentioned forces, said master rods being operatively disposed in cylinders separated from each other by an angle not materially greater than a quadrant.

3. In a multi-row engine in which objectionable harmonic torque variations are produced in timed relation with the rotation of the crankshaft, a master rod connected with a crankthrow, link rods associated with said master rod and a piston mounted on said master rod and adapted to reciprocate in a cylinder, another master rod, and link rods connected with a crankthrow, and a piston connected with said another master rod and adapted to reciprocate in a cylinder, each master rod assembly creating vibration-exciting forces and constructed and arranged so that the angular distance traversed by the crankshaft between top dead center of one master rod piston and top dead center of the other master rod piston is substantially equal to the distance traversed by the crankshaft during one cycle of the objectionable harmonic vibration divided by the number of rows or pairs of rows of cylinders.

4. In a radial engine having cylinders grouped in two rows each of an odd number of cylinders and arranged in staggered relation, a master-rod and link-rod system for each row in which both master rods are connected to an opposed throw crankshaft and each master rod is connected to a piston, the respective pistons being in contiguous cylinders in said two rows.

5. A two-row radial engine having a master-rod-and-link-rod system for each row in which both master rods are connected to an opposed throw crankshaft and one master rod is connected to a piston in a cylinder spaced approximately 90 degrees from the cylinder having the piston to which the other master rod is connected.

GEORGE L. WILLIAMS.